United States Patent [19]

von Hörsten

[11] 3,801,911

[45] Apr. 2, 1974

[54] SYNCHRONOUS FM-MODEM

[75] Inventor: Hans-Joachim von Hörsten, Bremen, Germany

[73] Assignee: U.S. Philips Corporation, New York, N.Y.

[22] Filed: Feb. 8, 1972

[21] Appl. No.: 224,441

[30] Foreign Application Priority Data

Feb. 13, 1971 Germany ............................ 2106836

[52] U.S. Cl. ................ 325/30, 178/66 R, 325/38 A

[51] Int. Cl. ............................................. H04l 27/10

[58] Field of Search ............ 325/38 A, 42, 65, 141, 325/30, 38 R; 178/66 R, 68; 340/347 PP; 329/145; 332/23 R

[56] References Cited

UNITED STATES PATENTS 3,139,615 6/1964 Aaron ............................... 325/38 A 3,230,310 1/1966 Brogle, Jr. ............................ 178/68

*Primary Examiner*—Benedict V. Safourek
*Attorney, Agent, or Firm*—Frank R. Trifari

[57] ABSTRACT

A synchronous in-plant FM modem for data transmission through local cables or internal telephony lines by means of FSK-modulation. The in-plant modem, when being used in a multi-drop arrangement, may be adapted in a simple manner to the various transmission characteristics by selectively subtracting a delayed version of the modulated carrier from the modulated carrier in the transmitter section thereby selectively producing either binary FSK or pseudoternary FSK and by adjusting in the receiver section the value of a coupling capacitor between line output and receiver filter.

2 Claims, 5 Drawing Figures

SYNCHRONOUS FM-MODEM

Figure 1:
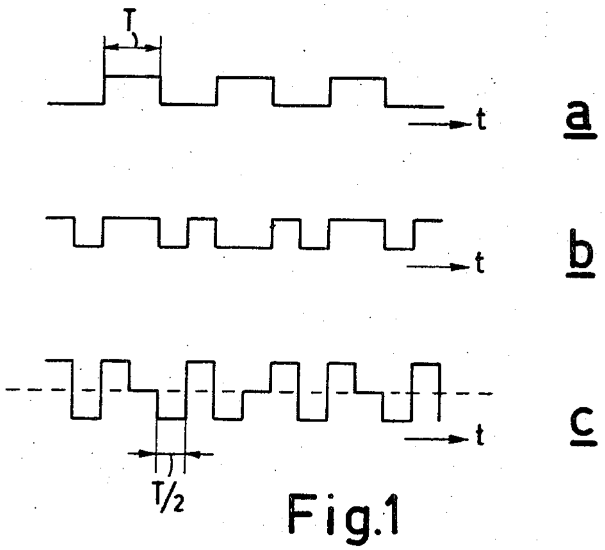

The invention relates to a synchronous modem whose transmitter section includes a modulator and whose receiver section includes a demodulator for the synchronous FM-transmission of binary coded data signals through internal telephony lines or local cables by means of frequency-shift-keying with continuous phase. The modem is provided with a main generator for generating a fundamental frequency from which both the clock frequencies of the data signals and the characteristic carrier frequencies for the modulator are derived.

In systems for remote processing of data signals an increasing number of data input and data output terminals are connected through telephone lines to the central computer. Notably, there is a growing number of data terminals located in a relatively small area, such as a plant, a building or a local telephony network. Local cable networks or own internal telephony networks may be used within these locally bounded telephony systems. The separate data terminals are then connected through special modems adapted to the transmission characteristics of these lines ("in-plant" modems) to a common 4-wire telephony connection so as to form a multidrop arrangement. Dependent on the size of these multidrop arrangements, the type of cable and the number of data terminals connected, the transmitters and receivers of the modems associated with the separate data terminals and the central computer are to be matched.

When transmitting digitally modulated data signals, signal distortions are produced due to the transmission characteristic of the line. The transmission properties of a multidrop arrangement are dependent on the type of cable, the configuration of the network and the number of data terminals connected. When installing such an arrangement the transmission band of the receiver in the internal modem is generally to be equalized both at the end of the data terminal and at the end of the computer so as to reduce the signal distortions.

In data transmission systems using local cable networks or internal telephony networks, the data terminals in a multidrop arrangement are coupled to 4-wire lines. The digital data signal is modulated by means of in-plant modems and adapted to the properties of the transmission channel. As a result simple and flexible network configurations are obtained, which, however, on account of reflections at the branch points are more unfavorable as regards signal distortion than network configurations in which the branches are formed by means of transmission forks.

Data traffic is effected both from the line control unit of the central computer to the data terminal and in the reverse direction. A given transmission system must be equalized in both transmission directions in dependence on the network configuration so as to minimize the signal distortions.

Dependent on the length of the line and the network configuration, the receivers are connected to the line with a high input impedance or an input impedance matched to the line.

During transmission the transmitter has a low impedance relative to the characteristic impedance of the line, and the transmitter has a high impedance when the data terminal does not transmit any data signal.

To ensure reliable regeneration of the transmitted data signal in the receiver, the position of the zero crossings in the data signals relative to the time raster determined by the clock frequency is to be maintained during transmission.

Consequently, the phase positions of the component oscillations of the data signal and hence the group delay time must be independent of the frequency. When the spectrum of the data signal extends to the frequency zero, the phase delay time must likewise be independent of the frequency.

Analogous networks employing such a phase characteristic can only be approximately realized. For phase equalization of a given network configuration it is necessary to adjust different sections of each equalizer in which, in addition, the parameters of the different network sections influence one another so that the adjustment of the equalizers in the system becomes extremely intricate when performed in the manner commonly used for the known modems.

It is an object of the invention to provide a modem of the type described in the preamble in which the transmitters and receivers of the modems are adapted in a very simple manner to the characteristics of the data transmission network.

According to the invention the synchronous modem is characterized in that in the transmitter section two channels are connected to the modulator output, the first channel directly conveying the frequency-modulated signal and the second channel being provided with a delay circuit having a delay time which is equal to half the period of the highest characteristic carrier frequency, the transmitter section furthermore including a combination circuit selectively connected to either the first channel for directly applying the frequency-modulated signal to the output of the transmitter section, or to both channels for applying a difference signal to the output of the transmitter section, said difference signal being obtained by producing the difference between the frequency-modulated signal in the first channel and the delayed frequency-modulated signal in the second channel, the line input in the receiver section being connected through a variable coupling capacitor to the input of the receiver filter.

By using the steps according to the invention, only one parameter is to be varied at the transmitter and receiver ends for the equalization of the transmission band, and this with the aid of a switch or soldered joint and a capacitor, respectively. The ultimate equalization of the transmitted data signal is effected in the receiver, and this with the aid of a variable capacitor so that the transmission characteristic of the receiver filter is adapted to the received signal in such a manner that optimum regeneration of the signal takes place.

Figure 2:
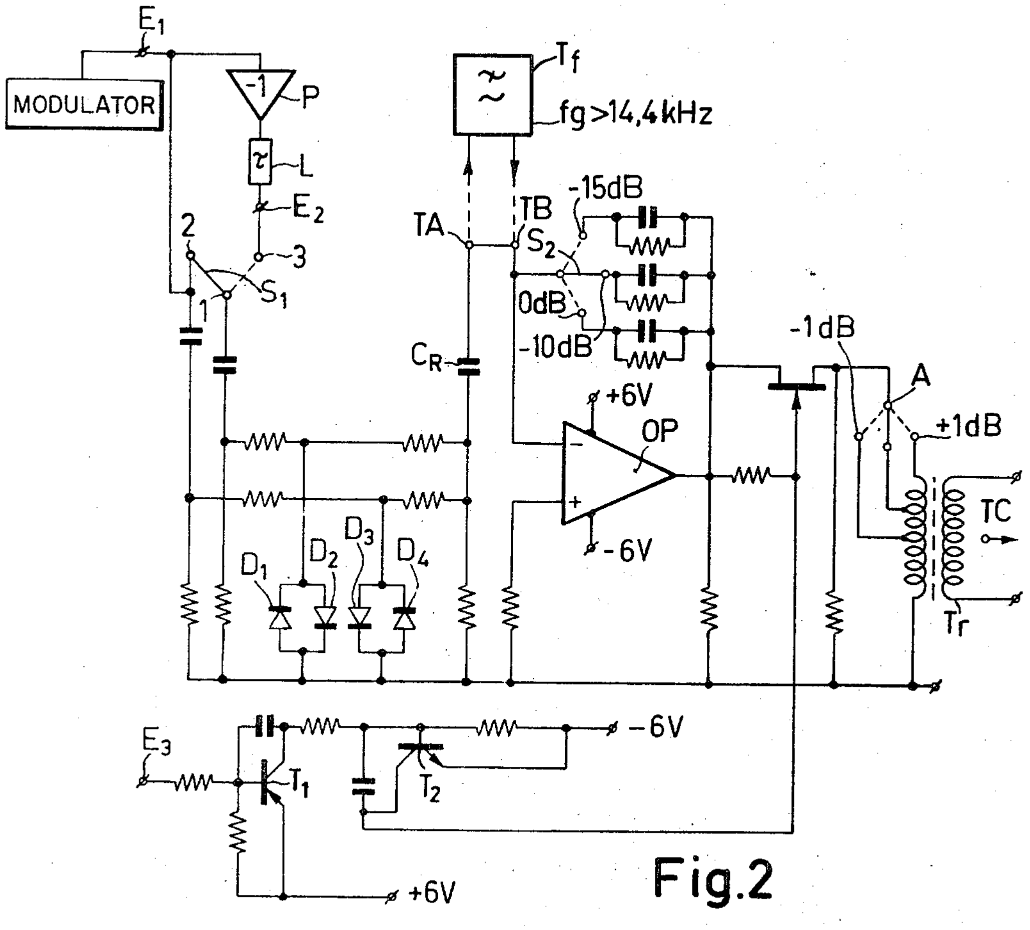
Figure 3:
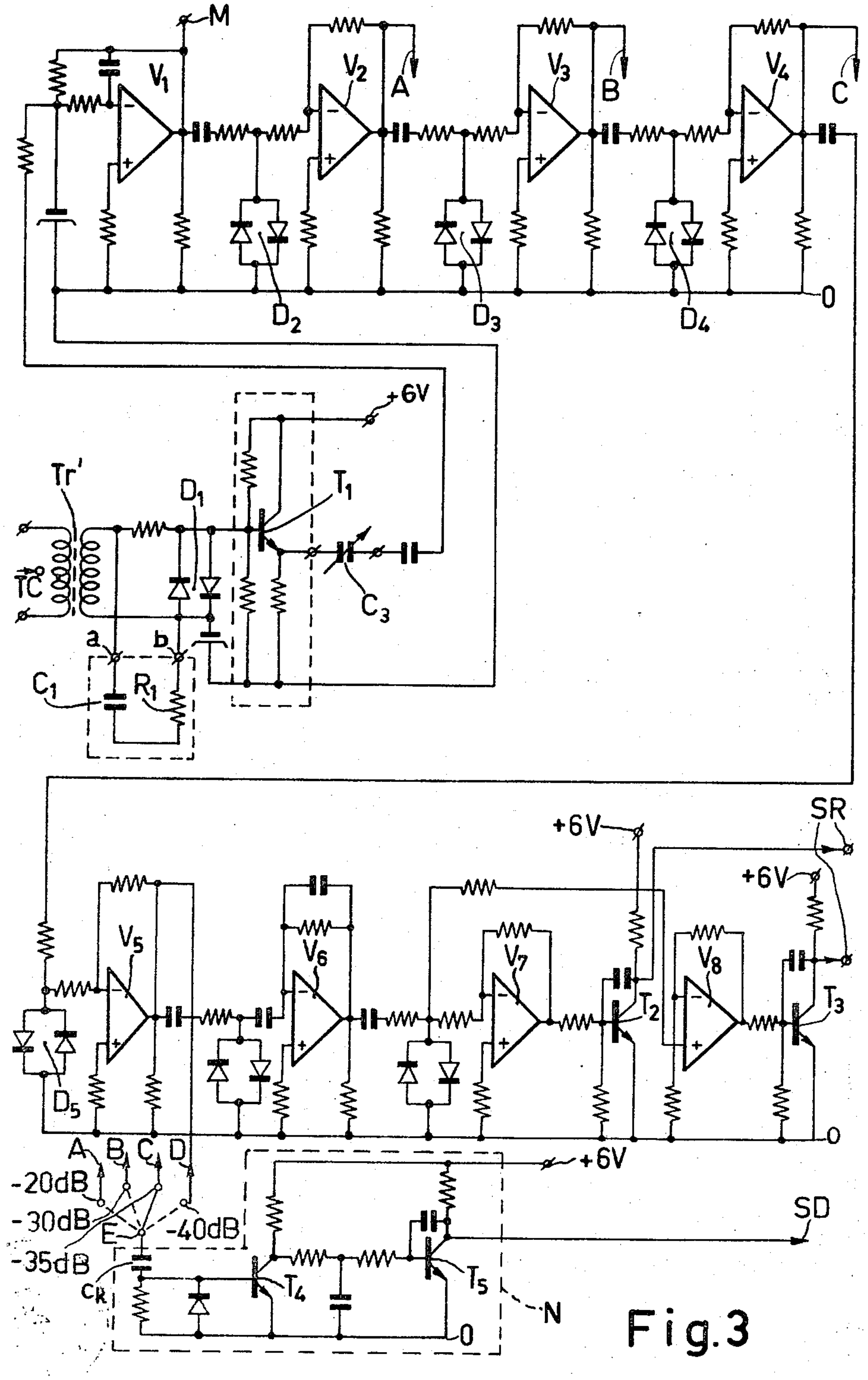

In order that the invention may be readily carried into effect, some embodiments thereof will now be described in detail by way of example with reference to the accompanying diagrammatic drawings, in which FIGS. 1*a*–1*c* show time diagrams of the signals in one embodiment of the modem according to the invention, while FIG. 2 shows an embodiment of the transmitter section connected to the modulator and FIG. 3 shows an embodiment of the receiver section of the modem connected to the lead.

The in-plant modem operates in accordance with the frequency shift keying method, hereinafter referred to as FSK. A data signal having a binary value of "1" corresponds to a characteristic carrier frequency of, for example, 4,800 Hz and a data signal having a binary value of "0" corresponds to a characteristic carrier frequency of, for example, 9,600 Hz. This permits a transmission speed of, for example, 9,600 bits/s. In principle, other speeds are also possible. The clock frequency for the data-processing arrangement and the characteristic carrier frequencies for the modulator in the modem are derived from one and the same fundamental frequency of a main generator. The frequency shifts occurring at the instants of the data transitions coincide with the instants of the zero crossings of the two carrier signals so that after the shift the transmitted carrier has an initial phase of 0° or 180° (FSK with continuous phase).

The distribution of the modulation spectrum of a signal thus modulated varies as a function of the frequency $f$ for a random binary data signal in accordance with the function $\sin^2 x/x$, in which $x$ corresponds to $(\pi f T/2)$ and T is equal to the period of the highest characteristic carrier frequency. At the low frequencies, the spectrum has components of a high energy level and for the embodiment given it has its first zero at 19,200 Hz. The spectrum components above 14,400 Hz only have a low energy level so that an input filter having a cut-off frequency of 14,400 Hz is adequate for the receiver. The spectrum components at the high frequencies cut off by this filter influence the signal distortion to a slight extent only.

The large portion of the spectrum components at the low frequencies in the above-mentioned modulation spectrum has a disturbing effect in case of large lengths of the transmission line. Since the attenuation of the line decreases at the low frequencies (the line behaves approximately as a lowpass filter), the portion of the low frequencies at the receiver end of the line in case of very long transmission lines is so large that the components at the high frequencies which are determinative for the zero crossings almost completely disappear and the zero crossings of the data signals are lost. Thus, it is advantageous to choose the modulation method in such a manner that from the beginning, especially for long lines, fewer components of low frequencies are present in the spectrum of the modulated signal.

According to the invention, a suppression of the low frequencies in the spectrum of the modulated signal is effected in a simple manner in that in the transmitter section two channels are connected to the modulator output, the first channel conveying the frequency-modulated signal directly and the second channel being provided with a delay circuit having a delay period which is equal to half the period of the highest characteristic carrier frequency, the transmitter section furthermore including a combination circuit selectively connected to either the first channel for directly applying the frequency-modulated signal to the output of the transmitter section, or to both channels for applying a difference signal to the output of the transmitter section, said difference signal being obtained by producing the difference between the frequency-modulated signal in the first channel and the delayed frequency-modulated signal in thhe second channel.

In this manner the original binary FSK-signal is converted into a pseudo-ternary FSK-signal when the combination network is connected to both channels, while particularly the spectrum components near zero frequency are suppressed to a considerable extent. Particularly in the embodiment described, the distribution of the pseudo-ternary modulation spectrum now varies as a function of the frequency $f$ for a random binary data signal in accordance with the function $(\sin^2 x/x) \cdot \sin x = \sin^3 x/x$ in which, likewise as in the foregoing, x corresponds to $(\pi f T/2)$ and T is equal to the period of the highest characteristic carrier frequency.

FIG. 1 shows at *a* a data signal to be transmitted while *b* shows the binary FSK-signal and *c* shows the pseudo-ternary FSK-signal. FIG. 1 shows that in the pseudo-ternary FSK-signal *c* the pulses correspond as regards their polarity to the differentiated binary FSK-signal. Since, as a first approximation, the transmission line has an integrating character at low frequencies, it may be expected that at a given length of the line the pseudo-ternary FSK-signal trails of into the original binary FSK-signal. Consequently, for short lines the binary FSK-signal is directly transmitted while for an increase in the length of the line, when the distortions increase to a great extent, the transmitter section of the modem is switched over for transmitting the pseudo-ternary FSK-signal.

FIG. 2 shows the transmitter section of the modem connected to the modulator. The transmission level may be adjusted with the aid of a switch or soldered joints S2 at 0 dB, −10 dB and −15 dB. It is possible to adjust at binary FSK-signals or at pseudo-ternary FSK-signals with the aid of a switch or of soldered joints S1. The transmitter section may be connected to different taps at the primary end of an output transformer T*r* with the aid of a switch or soldered joints A so that the transmission level can be varied in steps of 1 dB.

The output of the modulator is connected to input $E_1$ of FIG. 2; from input $E_1$ a first channel leads directly to a first input of a combination circuit in the form of an operational amplifier OP which operates as an adder in this case. In addition, a second channel is connected to input $E_1$ in which a polarity inverter stage P and a delay circuit L are arranged in cascade. The delay circuit L has a delay period $\tau = T/2$ in which T is the period of the highest characteristic carrier frequency; in the embodiment described $\tau$ is equal to half the period of the carrier frequency of 9,600 Hz. A second input of the combination circuit OP is provided with a switch or soldered joints $S_1$ with which this combination circuit OP can be connected either to the first channel only (points 1 and 2 of $S_1$ interconnected) or to both the first and the second channel (points 1 and 3 of $S_1$ interconnected). In the first case (connection 1–2) the binary FSK-signal applied to input $E_1$ is passed on through the combination circuit OP directly to the output transformer T*r*. In the second case, (connection 1–3) the combination circuit OP is utilized for producing a difference signal between the binary FSK-signal at input $E_1$ of the first channel and the polarity-inverted delayed binary FSK-signal at output $E_2$ of the second channel. The pseudo-ternary FSK-signal thus obtained at the output of the combination circuit OP is then passed on to the output transformer Tr. The limiter diodes D1–D4 ensure that signals of constant amplitude are applied to the operational amplifier OP because the voltages present at input E1 and output E2 may vary due to tolerances of the previous switching elements. As regards the frequency the signal to be transmitted is limited by a feedback capacitor $C_R$ in the feedback circuit of the operational amplifier OP. An additional lowpass filter T$f$ (cut-off frequency $f_g$ > 14.4 kHz) may be connected between the connection points TA–TB of this feedback circuit in order to limit the transmission spectrum to, for example, 15 kHz, if necessary.

In its rest condition the transmitter has to form a high impedance for the transmission line TC, that is to say, the output impedance is then high relative to the characteristic impedance of the transmission line TC. The field effect transistor FET located in the output circuit of the operational amplifier OP is then cut off. In addition, the binary FSK-signal applied to the input E1 is then absent because the modulator is switched off. In the operating condition of the transmitter, when data signals are transmitted, transistor FET is rendered completely conducting by a command signal at input E3. The shunt inductance of output transformer T$r$ is chosen to be such that in case of a switched off transmitter its output impedance at the low characteristic carrier frequency (in this case, for example, 4,800 Hz) satisfies the high impedance condition. When the transmitter is switched off, reflections and discharge phenomena on the transmission line TC may have a disturbing influence on other receivers in the system. Consequently, field effect transistor FET is cut off approximately 3.5 ms after the data signal is switched off (the command signal at E3 for switching off the transmitter occurs with a delay of 3.5 ms in the example chosen). The energy remaining in the transmission line TC after the data signal is switched off may therefore be depleted through the still low output impedance of the transmitter.

FIG. 3 shows the structure of the receiver section of the modem connected to the transmission line TC. The received signal is applied through a transformer T$r'$ and a limiter diode pair D1 to an impedance converter $T_1$. A first operational amplifier V1 is arranged as an active lowpass filter (cut-off frequency $fg$ = 14.1 kHz) with an amplification factor of 10. Subsequently there follow four operational amplifiers V2, V3, V4 and V5 acting as limiters. The limiting is performed by the limiter diode pairs D2–D5 in order to avoid overdrive of the operational amplifiers, which would lead to asymmetrically limited signals. An operational amplifier V6 acting as a differentiator then follows. By exclusively utilizing the transitions of the received signal, the data signal may thus even be recovered when part of the zero crossings is lost due to the transmission.

The pulses obtained by differentiation of the equalized and amplified data signal are limited and, dependent on their polarity, they are amplified by operational amplifiers V7 and V8, respectively. These pulses together constitute the control signal RS for an SR flipflop (not further shown in FIG. 3) in the following digital section of the modem, while the desired binary FSK-signal appears at the output of this flipflop.

A threshold value detector N including transistors T4 and T5 is connected to the limiter amplifiers V2–V5, the sensitivity of the detector being adjustable because its input E may selectively be connected to one of different outputs A, B, C and D of the limiter amplifiers V2–V5. The value of the coupling capacitor $c_k$ is chosen to be so low that low-frequency oscillations on the line SD, which in spite of the measures taken in the transmitter may still occur when the transmitter is switched off, cannot make the threshold value detector N responsive. The threshold value detector N has, for example, a response time and a decay time of 2.5 ms.

The number of limiter amplifiers V2–V5 is given by the range of the level variations to be processed (40 dB) and by the threshold voltages of the limiter diode pairs D2–D5.

For equalizing the received signal, according to the invention the output of the impedance converter $T_1$ is connected through a variable capacitor C3 to the receiver filter V1. Dependent on its value this capacitor C3 passes the high frequencies at a relatively larger amplitude, which frequencies are more attenuated by the transmission line TC than are the low frequencies.

A cable limitation impedance (line build out) constituted, for example, by a resistor R1 and a capacitor C1 may be connected to the secondary side of the input transformer T$r'$ (taps $a$ and $b$) so as to match the transmission line TC at the receiver end.

In the receiver the transmission band is equalized in a simple manner by means of capacitor C3. To this end an oscilloscope is connected to the test point M at the output of receiver filter $V_1$. The received signal is displayed on the screen of the oscilloscope. This display of the received signal is denoted by the term eye-pattern. The eye-pattern is a known means for judging the transmission quality. By adjusting capacitor C3, an optimum equalization can be realized in a simple manner with the aid of the eye-pattern, in this case with the aid of the position of the zero crossings of the received signal.

What is claimed is:

1. A synchronous modem for transmission of data signals through local cables, comprising a transmitter section; and a receiver section; a frequency modulator in the transmitter section for converting binary coded data signals into frequency shift-keyed signals with continuous phase, a main generator in the transmitting section for providing clock frequencies for the binary coded data signals and for providing carrier frequencies for the modulator, means dividing the modulator output into a first and a second channel, means in the second channel for providing a phase delay between the first and second channels equal to one-half the period of the highest carrier frequency, summing means for selectively subtracting the delayed modulated output in the second channel from the modulated output in the first channel, means connecting the output of the summing means to the local cables, a low pass filter in the receiving section, a variable capacitor in the receiving section, means in the receiver connecting the filter to the local cables through the variable capacitor for adjusting by means of the variable capacitor the proportion of high to low frequencies to the filter, a demodulator in the receiver section, and means for connecting the filter to the demodulator.

2. A synchronous modem as claimed in claim 1, wherein the summing means comprises operational amplifier operating as an adder, and having a first and second adder inputs, means connecting the first adder input of the operational amplifier to the first channel, a signal inverter connected in series with the phase delay providing means in the second channel, and means for selectively connecting the modulated data signals in the first channel or the phase delayed and signal inverted modulated data signals from the second channel to the second input of the operational amplifier.

* * * * *

PO-1050
(5/69)

UNITED STATES PATENT OFFICE
CERTIFICATE OF CORRECTION

Patent No. 3,801,911 Dated April 2, 1974

Inventor(s) HANS-JOACHIM VON HORSTEN

It is certified that error appears in the above-identified patent and that said Letters Patent are hereby corrected as shown below:

ON THE TITLE PAGE

"[30] Foreign Application Priority Data

Feb. 13, 1971 Germany.................2106836"

should read

--[30] Foreign Application Priority Data

Feb. 13, 1971 Germany.............P.2106836.0--;

Signed and sealed this 10th day of September 1974.

(SEAL)
Attest:

McCOY M. GIBSON, JR.
Attesting Officer

C. MARSHALL DANN
Commissioner of Patents